United States Patent
Fukui et al.

(10) Patent No.: US 10,549,394 B2
(45) Date of Patent: Feb. 4, 2020

(54) CLAMP DEVICE

(71) Applicant: SMC CORPORATION, Chiyoda-ku (JP)

(72) Inventors: Chiaki Fukui, Abiko (JP); Kazuyoshi Takahashi, Koto-ku (JP); Takeshi Seo, Nagareyama (JP)

(73) Assignee: SMC CORPORATION, Chiyoda-ku (JP)

( * ) Notice: Subject to any disclaimer, the term of this patent is extended or adjusted under 35 U.S.C. 154(b) by 179 days.

(21) Appl. No.: 15/568,669

(22) PCT Filed: Jan. 5, 2016

(86) PCT No.: PCT/JP2016/050108
§ 371 (c)(1),
(2) Date: Oct. 23, 2017

(87) PCT Pub. No.: WO2016/170802
PCT Pub. Date: Oct. 27, 2016

(65) Prior Publication Data
US 2018/0141176 A1    May 24, 2018

(30) Foreign Application Priority Data
Apr. 24, 2015 (JP) .................. 2015-089697

(51) Int. Cl.
*B23Q 3/06* (2006.01)

(52) U.S. Cl.
CPC ..................... *B23Q 3/06* (2013.01)

(58) Field of Classification Search
CPC .......... B23Q 3/06; B23Q 7/043; B25B 5/064; B25B 5/087; B25B 5/068; B25B 5/085;
(Continued)

(56) References Cited

U.S. PATENT DOCUMENTS 4,518,187 A * 5/1985 Blatt .................. B23Q 7/043
                                                    294/119.1
6,079,896 A * 6/2000 Dellach .................. B25B 5/087
                                                    269/32
(Continued)

FOREIGN PATENT DOCUMENTS

JP       60-178592 U    11/1985
JP       2005-153123 A   6/2005
(Continued)

OTHER PUBLICATIONS

International Search Report dated Feb. 2, 2016, in PCT/JP2016/050108, filed Jan. 5, 2016.
(Continued)

*Primary Examiner* — Christopher M Koehler
(74) *Attorney, Agent, or Firm* — Oblon, McClelland, Maier & Neustadt, L.L.P.

(57) ABSTRACT

The present invention relates to a clamp device. The clamp device is provided with a driving force transmission mechanism, which transmits driving force from a drive unit to clamp arms. The driving force transmission mechanism converts the rectilinear movement of a piston rod of the drive unit into: a first operation, in which the clamp arms rotate while moving in directions toward or away from each other; and a second operation, in which the clamp arms move in parallel in directions toward or away from each other with gripping surfaces in a mutually parallel state.

6 Claims, 8 Drawing Sheets

(58) Field of Classification Search
CPC .. B25B 5/08; B25B 5/12; B25B 5/122; B25B 1/08
See application file for complete search history.

(56) References Cited

U.S. PATENT DOCUMENTS

| | | | | |
|---|---|---|---|---|
| 6,115,898 | A * | 9/2000 | Sawdon | B25B 5/087 269/233 |
| 6,290,210 | B1 * | 9/2001 | Horn | B23Q 7/043 254/34 |
| 2002/0084564 | A1 * | 7/2002 | Horn | B23Q 7/043 269/32 |
| 2002/0093211 | A1 * | 7/2002 | Filipiak | B25B 5/087 294/203 |
| 2004/0061268 | A1 * | 4/2004 | Sawdon | B25B 5/064 269/32 |
| 2009/0184451 | A1 * | 7/2009 | Hiromatsu | B25B 5/087 269/238 |

FOREIGN PATENT DOCUMENTS

| | | |
|---|---|---|
| JP | 2009-12138 A | 1/2009 |
| JP | 4950123 B2 | 6/2012 |
| JP | 2015-37829 A | 2/2015 |
| JP | 2015-205380 A | 11/2015 |

OTHER PUBLICATIONS

Extended European Search Report dated Nov. 28, 2018 European Patent Application No. 16782824.3, citing document AO therein. 7 pages.
Combined Chinese Office Action and Search Report dated Nov. 29, 2018 in Chinese Patent Application No. 201680022755.9 (with English translation), citing documents AA and AB therein, 16 pages.

* cited by examiner

CLAMP DEVICE

TECHNICAL FIELD

The present invention relates to a clamp device for clamping a workpiece with a plurality of clamp arms.

BACKGROUND ART

The clamp device is widely used in a welding process of an automatic assembly line of the machine industry and the like. A clamp device of this type generally has a pair of clamp arms rotatably mounted on a clamp body via pins. By applying a driving force of a cylinder to one end portion of each clamp arm, these clamp arms are rotated about the pins, and a workpiece is clamped and positioned from the left and right sides by a gripping surface provided at the other end portion of each clamp arm. Then, the workpiece is subjected to necessary processing and a transportation process (see, for example, Japanese Patent No. 4950123).

Among those clamp devices, for example, Japanese Laid-Open Patent Publication No. 2015-037829 discloses a clamp device in which a pair of clamp arms having attachments attached to the gripping surfaces and a pair of clamp arms having no attachment attached to the gripping surfaces are selectively rotated.

In addition, Japanese Laid-Open Patent Publication No. 2009-012138 discloses a clamp device that clamps a workpiece by translating a pair of clamp arms in a direction to approach or separate from each other.

SUMMARY OF INVENTION

The clamp device disclosed in above-mentioned Japanese Patent No. 4950123 has a constant gap (hereinafter referred to as a clamp distance) between the gripping faces at a clamping position where the gripping faces of a pair of clamp arms are parallel to each other. Therefore, in the case where the clamp distance and the width dimension of the workpiece (the distance between the portions of the workpiece in contact with the gripping surface of each clamp arm) are different, it is not easy to apply a uniform clamping force to plural types of workpieces having different width dimensions. Therefore, it is sometimes impossible to clamp reliably such plural types of workpieces.

Therefore, when conveying plural types of workpieces having different width sizes to an automatic assembly line, it is necessary to prepare plural types of clamp devices with different clamp distances according to the types of workpieces.

On the other hand, in the technique disclosed in Japanese Laid-Open Patent Publication No. 2015-037829, one clamp device can clamp plural types of workpieces having different widths. However, because a plurality of clamp arms corresponding to the types of workpieces is required, the clamp device becomes complicated and large in size.

Further, when a pair of clamp arms are rotated about the pins, one end portions of the pair of clamp arms limit the maximum opening angle of the other end portions (gripping surfaces) of the pair of clamp arms to such an extent that the one end portions of the pair of clamp arms do not interfere with each other. That is, the gap between the pair of gripping surfaces in the unclamping state becomes comparatively narrow. In this case, it is necessary to avoid contact between the workpiece and the clamp arms, so that the supply direction and the discharge direction of the workpieces with respect to the clamp device may be restricted.

Furthermore, in the technique disclosed in Japanese Laid-Open Patent Publication No. 2009-012138, since the pair of clamp arms are merely translated, the degree of freedom in the supply direction and the discharge direction of the workpiece with respect to the clamp device is greatly restricted.

The present invention has been made in consideration of such a problem. It is an object of the present invention to clamp plural types of workpieces having different widths reliably and stably while suppressing upsizing of the device with a simple structure. It is also possible to increase the degree of freedom of the supply direction and the discharge direction of the workpieces.

A clamp device according to the present invention is to clamp a workpiece among a plurality of clamp arms. The clamp device comprises: a clamp body; a plurality of clamp arms supported movably with respect to the clamp body; a driving unit having a displacement body for linear reciprocating motion and provided on the clamp body; and a driving force transmission mechanism configured to transmit a driving force of the driving unit to each of the clamp arms, wherein the driving force transmission mechanism is configured to convert the linear motion of the displacement body into a first motion for moving and rotating the plurality of clamp arms in a direction toward or away from each other, and into a second motion for translating the plurality of clamp arms in a direction toward or away from each other in a state where gripping surfaces of the respective clamp arms to contact the workpiece are in parallel.

According to this configuration, since the clamp distance can be changed, it is possible to reliably and stably clamp plural types of workpieces having different widths while suppressing upsizing of the clamp device with a simple configuration. Also, as the clamp arms rotate, the distance between the gripping surfaces in the unclamping state can be made relatively wide, so that the degree of freedom in the supply direction and the discharge direction of the workpieces can be increased.

In the above-described clamp device, the driving force transmission mechanism may include a movable part provided on the displacement body, a first cam hole being formed in the movable part, a fixed part provided on the clamp body, a second cam hole being formed in the fixed part, a first shaft and a second shaft provided with respect to each of the clamp arms, a first roller rotatably provided on the first shaft and movable in the first cam hole, a second roller rotatably provided on the first shaft and movable in the second cam hole, and a third roller rotatably provided on the second shaft and movable in the second cam hole, wherein the movable part and the fixed part may be arranged so that the first cam hole and the second cam hole at least partially overlap each other in plan view.

According to such a configuration, as the movable part linearly moves with respect to the clamp body in accordance with the linear motion of the displacement body, the first roller moves in the first cam hole and the second and third rollers move in the second cam hole. Thus, the linear motion of the displacement body can be converted into the first motion and the second motion with a simple configuration.

In the above clamp device, the plurality of clamp arms may be provided as one pair. The pair of clamp arms include a pair of the first cam holes may be provided substantially in a laterally symmetrical manner, and a pair of the second cam holes may be provided substantially in a laterally symmetrical manner. Each of the first cam holes may be formed of a first hole portion and a second hole portion. The first hope portion extends toward a first axis of symmetry of the pair of first cam holes while inclining toward one side of a moving direction of the movable part. The second hole portion extends from the first hole portion toward the one side of a moving direction of the movable part while inclining toward the first axis of symmetry. Each of the second cam holes may be formed of a third hole portion and a fourth hole portion. The third hole portion extends toward a second axis of symmetry of the pair of the second cam holes while inclining toward the one side of a moving direction of the movable part. The fourth hole portion extends from the third hole portion toward the second axis of symmetry.

According to such a configuration, as the first roller moves within the first hole portion, each clamp arm is made to perform the first motion, and as the first roller moves within the second hole portion, each clamp arm is made to perform the second motion. Further, because the second hole portion is inclined in the direction toward the position of the first axis of symmetry with respect to the moving direction of the movable part, as the first roller moves in the second hole portion toward the one side in the direction along which the movable part moves, the clamping force exerted on the workpiece can be increased by the wedge action at the inclined surface angle (θ).

In the clamp device described above, the first shaft and the second shaft may be provided at an end of each of the clamp arms opposite to a side on which the gripping surface is located.

According to such a configuration, it is possible to prevent the end portions of the clamp arms on the side opposite to the side on which the gripping surfaces are located from interfering with each other in the unclamping state, so that the maximum opening angle of the clamp arm can be set relatively large. Thereby, the degree of freedom in the supply direction and the discharge direction of the workpieces can be further enhanced.

In the above clamp device, a pair of the movable parts, the fixed parts, the first rollers, the second rollers, and the third rollers may be disposed on both sides of the clamp arm in pairs.

According to such a configuration, it is possible to smoothly and stably perform the first motion and the second motion of the pair of clamp arms.

In the above-described clamp device, the movable part may be provided with a slide portion, and the clamp body may be provided with a guide portion for guiding the slide portion along the moving direction of the displacement body.

According to such a configuration, since the movable part can smoothly move linearly, the first motion and the second motion of the pair of clamp arms can be performed more smoothly and stably.

The clamp device may further include a workpiece disposing portion in which the workpiece is placed, and each of the clamp arms is arranged so as not to protrude from the workpiece disposing surface of the workpiece disposing portion to a side where the workpiece is located in the unclamping state.

According to such a configuration, interference between the workpiece and the clamp arm can be effectively suppressed, so that the degree of freedom in the supply direction and the discharge direction of the workpieces can be further enhanced.

According to the present invention, it is possible to reliably and stably clamp plural types of workpieces having different width dimensions while suppressing upsizing of the device with a simple structure, and to increase the degree of freedom of the supply direction and discharge direction of the workpieces.

DESCRIPTION OF EMBODIMENTS

Preferred embodiments of the clamp device according to the present invention will be described below with reference to the accompanying drawings.

The clamp device 10 according to the present embodiment clamps workpieces W1 and W2 between a pair (plurality) of clamp arms 16a, 16b, and is applied to, for example, a welding process of an automatic assembly line of the machine industry or the like.

Figure 1:
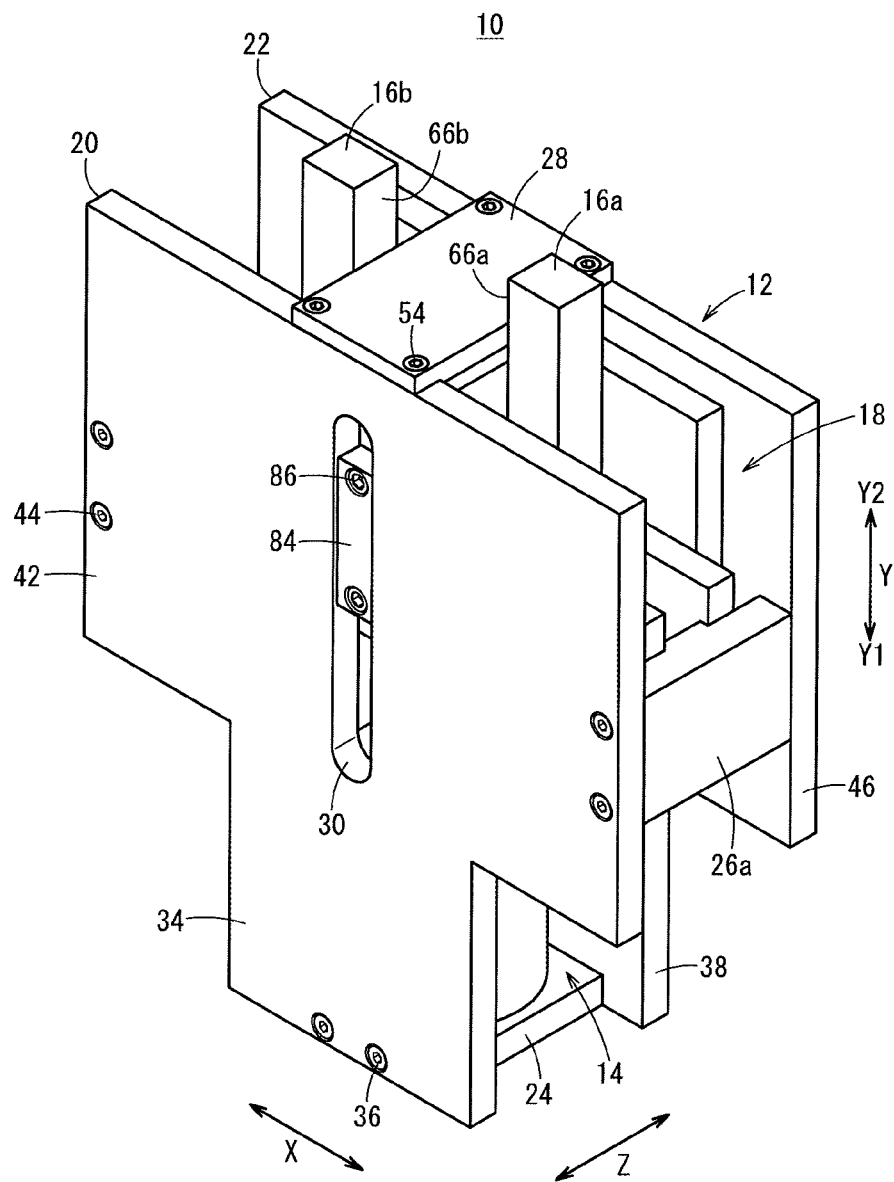
FIG. 1 is a perspective view of a clamp device according to an embodiment of the present invention.
Figure 2:
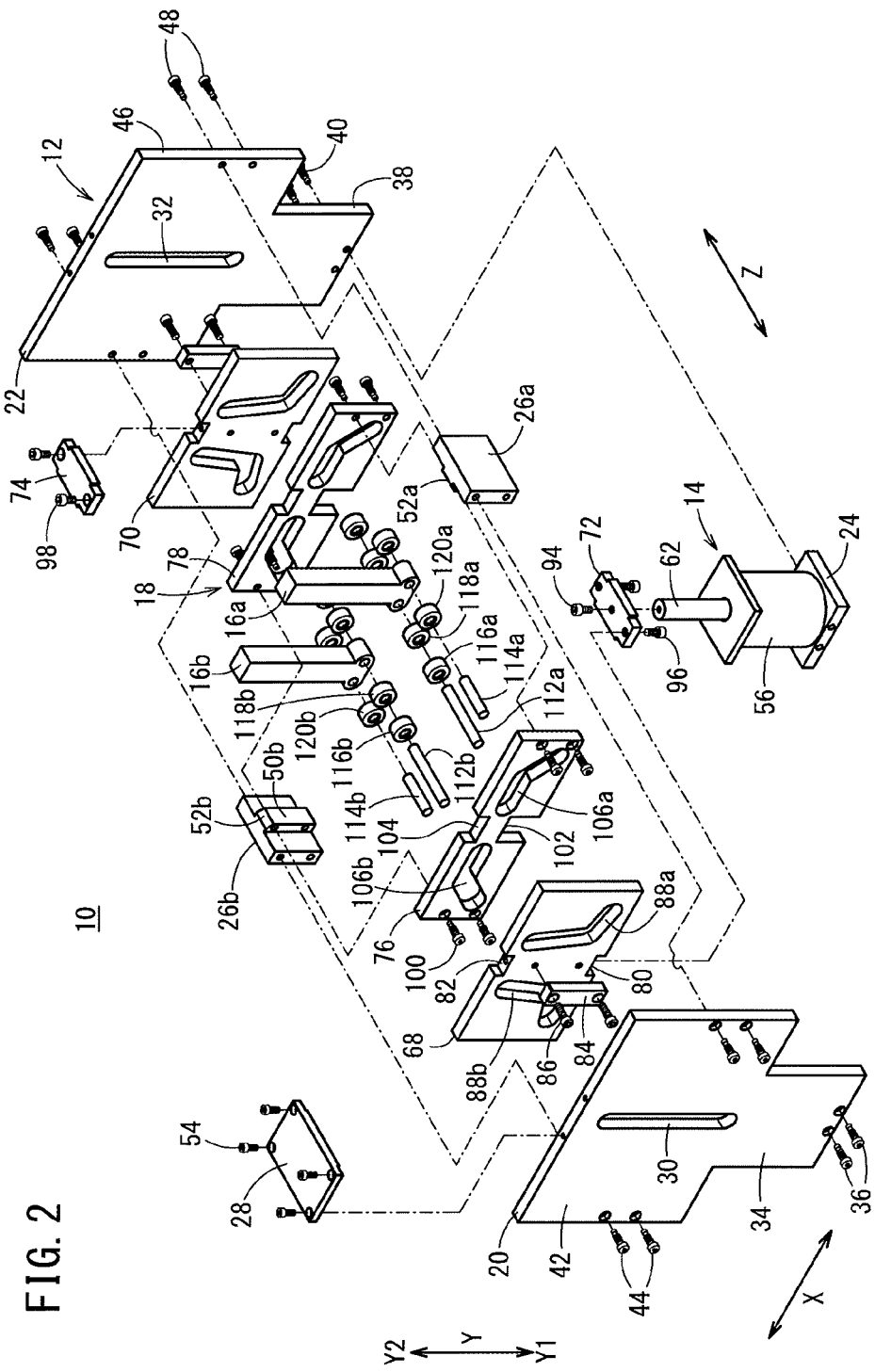
FIG. 2 is an exploded perspective view of the clamp device of FIG. 1.
Figure 3:
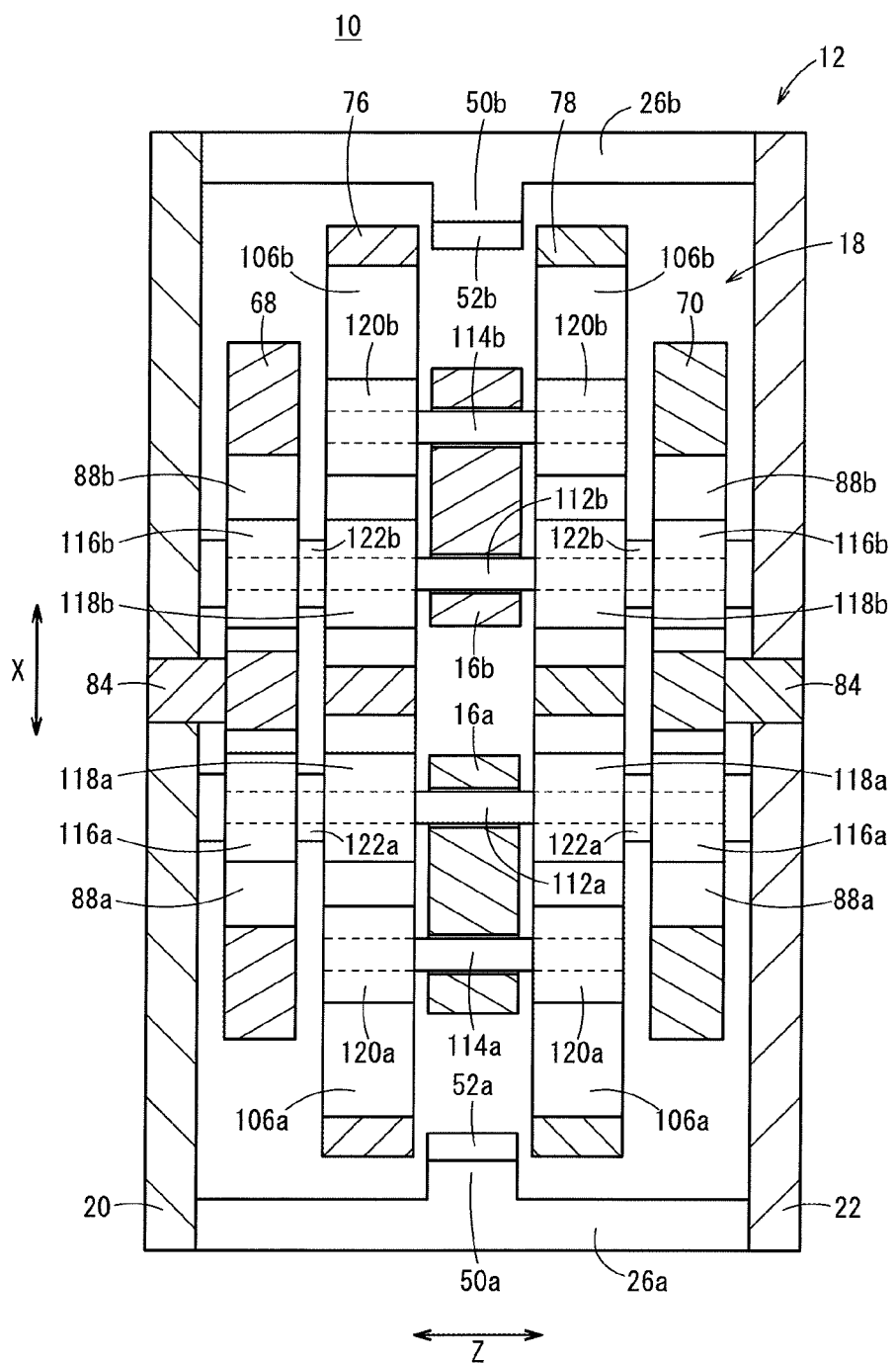
FIG. 3 is a transverse sectional view of the clamp device shown in FIG. 1.

As shown in FIGS. 1 to 3, the clamp device 10 includes a clamp body 12, a driving unit 14 provided on the clamp body 12, a pair of right and left clamp arms 16a, 16b movably provided on the clamp body 12, and a driving force transmission mechanism 18 that transmits a driving force of the driving unit 14 to the respective clamp arms 16a, 16b.

In the following description, it is assumed that the width direction of the clamp device 10 (the direction in which the clamp arms 16a, 16b are arranged) is the X direction, the direction perpendicular to the X direction and the longitudinal direction of the clamp device 10 is the Y direction, and the direction perpendicular to the X direction and the Y direction is taken as the Z direction. Further, in the Y direction, the downward direction in FIG. 1 is defined as the Y1 direction, and the upward direction in FIG. 1 is defined as the Y2 direction.

The clamp body 12 includes a pair of T-shaped plate bodies 20, 22 arranged substantially parallel to each other, while being spaced apart from each other by a predetermined distance; a base portion 24 connecting the narrow end portions of the plate bodies 20, 22; a pair of right and left connecting portions 26a, 26b for connecting the side portions of the plate bodies 20, 22 to each other; and a workpiece placement part 28 for connecting wide other ends of the plate bodies 20, 22 to each other.

Elongated holes (guide portions) 30, 32 are formed along the longitudinal direction (Y direction) at substantially the center in the width direction (X direction) of the plate bodies 20, 22. The base portion 24 is formed in a flat plate shape, one side surface of which is fastened to the substantially central portion in the width direction of a narrow portion 34 of the plate body 20 by screws 36, and the other side surface is fastened to the substantially central portion in the width direction of a narrow portion 38 of the plate body 22 by screws 40. Further, the base portion 24 is fixed to a floor surface or the like, for example, by unillustrated bolts or the like.

One side surface of each of the connecting portions 26a, 26b is fastened to a substantially central portion of a wide portion 42 of the plate body 20 in the Y direction by screws 44. The other side surface is fastened to the center portion in the Y direction of a wide portion 46 of the plate body 22 by screws 48. That is, the connecting portion 26a and the connecting portion 26b are opposed to each other in the X direction.

As shown in FIG. 3, on the inner surfaces of the connecting portion 26a (the surface facing the coupling portion 26b), at the approximate center in the arrangement direction (Z direction) of the pair of plate bodies 20, 22, a projecting portion 50a is formed along the entire length in the Y direction. An inclined surface 52a that is inclined to the outer surface side of the connecting portion 26a toward the Y2 direction is formed at an end of the distal end surfaces of the projecting portion 50a in the Y2 direction.

The connecting portion 26b has the same structure as the connecting portion 26a, and the projecting portion 50b and the inclined surface 52b are formed. As shown in FIGS. 1 and 2, the workpiece placement part 28 is a flat plate body on which the workpiece W1 is placed, and is fastened to the wide portions 42, 46 substantially at the center thereof in the X direction by screws 54.

Figure 5:
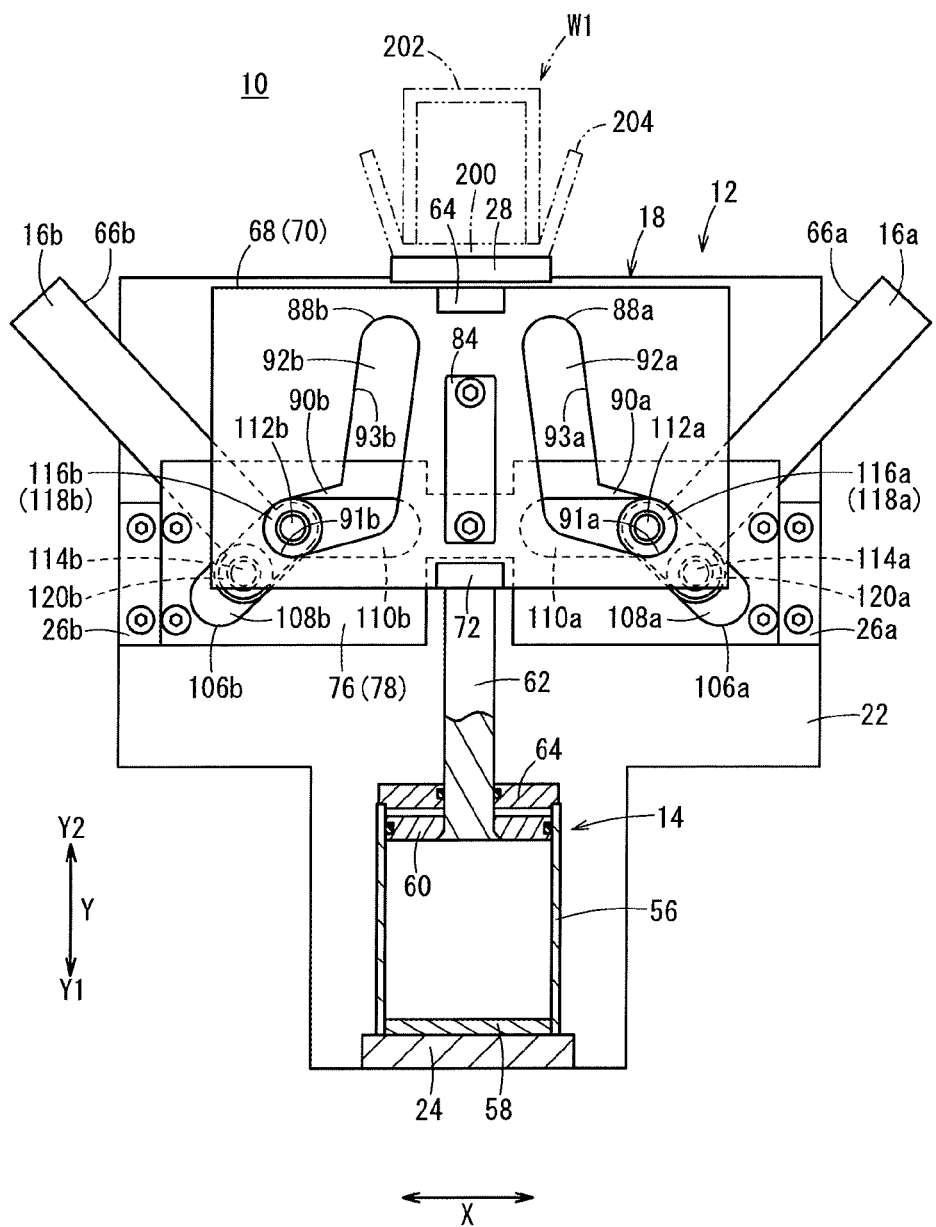
FIG. 5 is a partially omitted front view showing an unclamping state of the clamp device.

The driving unit 14 is configured as a fluid pressure cylinder (actuator). As shown in FIG. 5, the driving unit 14 includes a cylinder tube 56, an end block 58 that closes an opening in one end side (Y1 direction) of the cylinder tube 56, a piston 60 displaceably arranged along the axial direction inside the cylinder tube 56, a piston rod (displacement body) 62 connected to the piston 60, and a rod cover 64 supporting the piston rod 62 displaceably while blocking an opening in the other end side (Y2 direction) of the cylinder tube 56. The structure of the driving unit 14 is not particularly limited, and various mechanisms capable of linearly displacing the displacement body may be applied. For example, a linear electric actuator including a ball screw actuator or the like can be adopted as the driving unit.

The cylinder tube 56 is disposed between the narrow portions 34, 38 of the pair of plate bodies 20, 22 (see FIG. 1). A first port and a second port (not shown) for supplying and discharging compressed fluid (driving fluid) are formed in the cylinder tube 56.

As shown in FIGS. 1 and 2, the pair of clamp arms 16a, 16b are located between the pair of connecting portions 26a, 26b and are spaced apart from each other by a predetermined distance in the X direction. The clamp arm 16a is formed in a quadrangular prism shape. One end portion of the clamp arm 16a bulges to both sides in the X direction. On the other end portion of the clamp arm 16a, a gripping surface 66a contacting the workpieces W1, W2 is formed. The clamp arm 16b is configured similarly to the clamp arm 16a, and a gripping surface 66b is formed at the other end portion thereof.

The driving force transmission mechanism 18 includes a pair of movable plates (movable parts) 68, 70 arranged to be spaced apart from each other in the Z direction, a first connecting portion 72 connecting ends of the pair of movable plates 68, 70 in the Y1 direction in a state of being connected to the piston rod 62, a second connecting portion 74 connecting ends of the pair of movable plates 68, 70 in the Y2 direction, and a pair of fixed plates (fixed parts) 76, 78 which are arranged inward of the pair of movable plates 68, 70 in the Z direction with a gap between the fixed plates 76, 78.

The movable plate 68 and the fixed plate 76 are disposed between the pair of clamp arms 16a, 16b and the wide portion 42, and the movable plate 70 and the fixed plate 78 are disposed between the pair of clamp arms 16a, 16b and the wide portion 46. Further, the movable plates 68, 70 and the fixed plates 76, 78 extend in the X direction in a state parallel to the wide portions 42, 46. The movable plate 68 is configured in the same manner as the movable plate 70, and the fixed plate 76 is configured in the same manner as the fixed plate 78. Therefore, in the following, the configurations of the movable plate 68 and the fixed plate 76 will be described, and the description of the configurations of the movable plate 70 and the fixed plate 78 will be omitted.

At the approximate center in the X direction of the movable plate 68, a first arrangement portion 80 recessed so as to arrange the first connection portion 72 and a second arrangement portion 82 recessed so as to arrange the second connection portion 74 are formed. A slide portion 84 extending along the Y direction is fastened by screws 86 to the surface of the movable plate 68 facing the wide portion 42. The slide portion 84 is disposed slidably in the elongated hole 30 of the plate body 20 along the Y direction. As a result, the movable plate 68 can slide smoothly along the Y direction under the guiding action of the elongated hole 30 of the plate body 20.

Figure 4A:
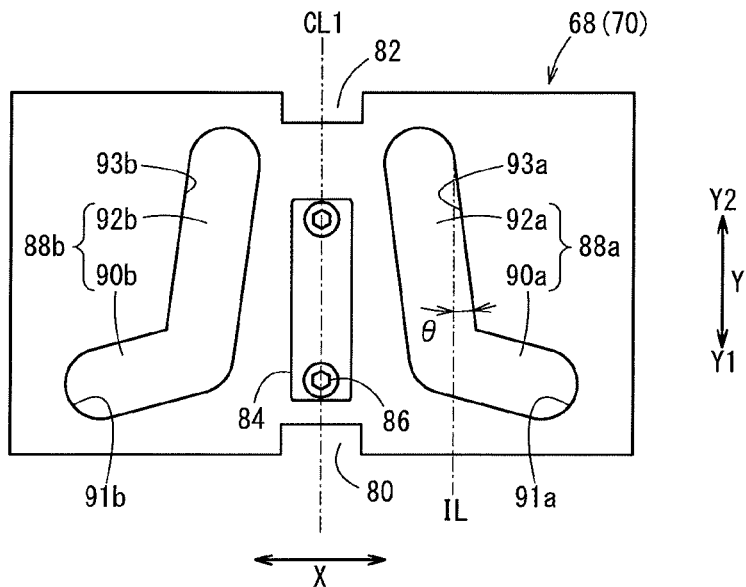
FIG. 4A is a plan view of the movable plate.

As shown in FIG. 4A, the movable plate 68 has a pair of first cam holes 88a, 88b formed substantially symmetrically with respect to the centerline (first axis of symmetry) CL1 in the X direction thereof. The first cam hole 88a is formed of a first hole portion 90a having an end portion 91a in the vicinity of the outer corner portion of the movable plate 68 in the Y1 direction and extending from the end portion 91a toward the inner side in the X direction (toward the centerline CL1) and inclined in the Y2 direction, and a second hole portion 92a extending from the innermost position of the first hole portion 90a in the X direction in the Y2 direction and inclined toward the inner side in the X direction. The first hole portion 90a is formed to be shorter than the second hole portion 92a. The inner surface 93a on the outer side of the second hole portion 92a is inclined at a predetermined inclined surface angle θ with respect to the imaginary line IL in the Y direction and functions as a wedge working surface for guiding the first roller 116a described later. The first cam hole 88b is configured similarly to the first cam hole 88a and includes a first hole portion 90b having an end portion 91b and a second hole portion 92b having an inner surface 93b.

Returning to FIG. 2, the first connecting portion 72 is a flat plate member extending in the Z direction, and the piston rod 62 is fastened to the substantially center in the Z direction by a screw 94. Both end portions of the first connecting portion 72 are formed to be narrower than the central portion thereof and are fastened by screws 96 in a state of being disposed in the first arrangement portions 80 of the movable plates 68, 70.

The second connecting portion 74 is a flat plate-shaped member extending along the Z direction. Both end portions of the second connecting portion 74 are formed to be narrower than the central portion thereof and fastened by screws 98 in a state of being disposed on the second arrangement portion 82 of the movable plates 68, 70.

Both ends of the fixed plates 76, 78 in the X direction are fastened to the projecting portions 50a, 50b by screws 100, so that the fixed plates 76, 78 are fixed to the clamp body 12. A first recessed portion 102 into which the first connecting portion 72 can be inserted and a second recessed portion 104 into which the second connecting portion 74 can be inserted are formed substantially in the center in the X direction of the fixed plates 76, 78. This prevents the first connecting portion 72 and the second connecting portion 74 from interfering with the fixed plates 76, 78 when the movable plates 68, 70 are displaced in the Y direction with respect to the fixed plates 76, 78.

Figure 4B:
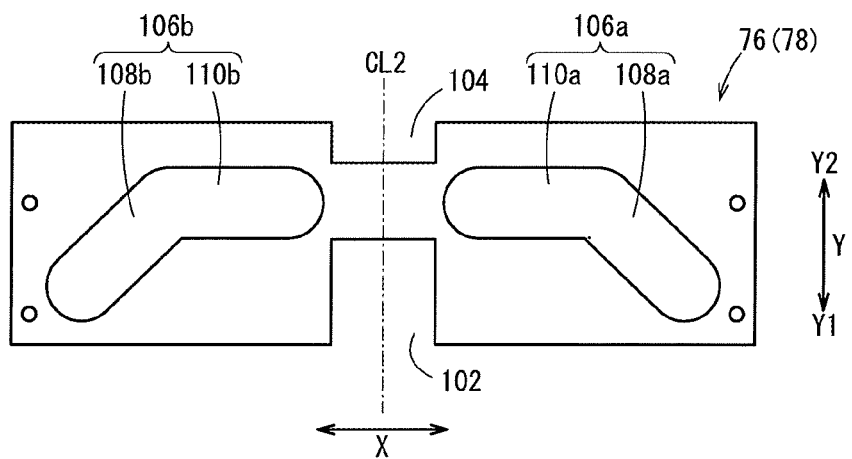
FIG. 4B is a plan view of the fixed plate.

As shown in FIG. 4B, the fixed plate 76 has a pair of second cam holes 106a, 106b formed substantially symmetrically with respect to the centerline (second axis of symmetry) CL2 in the X direction. A part of the second cam hole 106a is formed so as to overlap a part of the first cam hole 88a in plan view (front view) from the Z direction (see FIGS. 5 to 7). The same applies to the second cam hole 106b.

The second cam hole 106a is formed of a third hole portion 108a extending from the vicinity of the outer corner portion of the fixed plate 76 in the Y1 direction toward the inner side in the X direction (toward the centerline CL2) and inclined in the Y2 direction, and a fourth hole portion 110a extending along the X direction from the innermost position of the three hole portion 108a in the X direction inside. The third hole portion 108a is set to be substantially the same length as the fourth hole portion 110a. The second cam hole 106b is configured similarly to the second cam hole 106a, and has a third hole portion 108b and a fourth hole portion 110b.

As shown in FIG. 2, the driving force transmission mechanism 18 includes a first shaft 112a and a second shaft 114a provided (fixed) so as to penetrate through one end of the clamp arm 16a in the Z direction, a first roller 116a rotatably provided on the first shaft 112a and moving in the first cam holes 88a of the movable plates 68, 70, a second roller 118a rotatably provided on the first shaft 112a and moving in the second cam holes 106a of the fixed plates 76, 78, and a third roller 120a rotatably provided on the second shaft 114a and moving in the second cam holes 106a of the fixed plates 76, 78.

The first shaft 112a is located on the inner side in the X direction (the side on which the clamp arm 16b is positioned) than the second shaft 114a and is longer than the second shaft 114a. The first shaft 112a extends at both sides of the clamp arm 16a in the Z direction in a state of being provided at one end portion of the clamp arm 16a, and the first roller 116a and the second roller 118a are provided on the first shaft 112a at each side of the portions extending. The second shaft 114a extends at both sides of the clamp arm 16a in the Z direction in a state of being provided at one end portion of the clamp arm 16a, and the third roller 120a is provided on the second shaft 114a at each side of the portions extending. The first shaft 112a and the second shaft 114a are provided with holding members 122a (see FIG. 3) for holding the axial positions of the first to third rollers 116a, 118a, and 120a.

Further, the driving force transmission mechanism 18 includes a first shaft 112b and a second shaft 114b (fixed) provided so as to penetrate through one end portion of the clamp arm 16b in the Z direction, a first roller 116b rotatably provided on the first shaft 112b and moving in the first cam holes 88b of the movable plate 68, 70, a second roller 118b rotatably provided on the first shaft 112b and moving in the second cam holes 106b of the fixed plates 76, 78, and a third roller 120b rotatably provided on the second shaft 114b and moving in the second cam holes 106b of the fixed plates 76, 78.

The first shaft 112b, the second shaft 114b, the first to third rollers 116b, 118b, and 120b are similar in structure to those provided on the clamp arm 16a, and therefore description thereof is omitted. Note that holding members 122b (see FIG. 3) is provided on the first shaft 112b and the second shaft 114b.

The clamp device 10 according to the present embodiment is basically configured as described above. Next, the operation and effects thereof will be described. In the following description, the unclamping state in which the gripping surfaces 66a, 66b of the pair of clamp arms 16a, 16b shown in FIG. 5 are maximally separated from each other will be described as an initial position.

In this initial state, the first rollers 116a, 116b are positioned on the outermost side in the X direction in the first hole portions 90a, 90b. Further, the second rollers 118a, 118b are positioned at the boundaries between the third hole portions 108a, 108b and the fourth hole portions 110a, 110b, and the third rollers 120a, 120b are positioned at the fourth hole portions 110a, 110b.

Here, the workpiece W1 clamped by the above-described clamp device 10 will be briefly described. This workpiece W1 is composed of a first frame 200 having a U-shaped cross section and a second frame 202 having a U-shaped cross section combined with the first frame 200. The first frame 200 opens toward the Y2 direction, and both sidewalls 204 are inclined so as to gradually widen outward in the X direction toward the Y2 direction. On the other hand, the second frame 202 is disposed in the opening of the first frame 200 in a state of being open toward the Y1 direction.

The workpiece W1 is supplied (conveyed) to the workpiece placement part 28 of the clamp device 10 by a conveying device or the like of the automatic assembly line. At this time, the distance between the gripping surface 66a of the clamp arm 16a and the gripping surface 66b of the clamp arm 16b is considerably larger than the width dimension of the workpiece placement part 28, and the clamp arms 16a, 16b are advanced in the Y1 direction than the workpiece placement surface of the workpiece placement part 28. In other words, the clamp arms 16a, 16b do not protrude from the workpiece placement surface of the workpiece placement part 28 in the Y2 direction. Therefore, it is possible to smoothly supply the workpiece W1 to the workpiece placement part 28 without interfering with the clamp arms 16a, 16b.

That is, in the present embodiment, in order to supply and discharge the workpiece W1 not only from the Z direction (the direction orthogonal to the page of FIG. 5) and the Y2 direction but also from the X direction in the unclamping state of the clamp device 10. Therefore, the degree of freedom in the supply direction and the discharge direction of the workpiece W1 can be increased.

When the workpiece W1 is set in the workpiece placement part 28, the piston 60 is displaced toward the end block 58 under the action of the compressed fluid. Then, since the piston rod 62 is displaced in the Y1 direction, the movable plates 68, 70 are displaced in the Y1 direction while the slide portions 84 provided on the respective movable plates 68, 70 are guided by the elongated holes 30, 32. At this time, the first roller 116a rolls (runs) on the wall surface constituting the first hole portion 90a toward the second hole portion 92a, the second roller 118a rolls on the wall surface constituting the fourth hole portion 110a inward in the X direction, and the third roller 120a rolls on the wall surface constituting the third hole portion 108a toward the fourth hole portion 110a.

Basically, the operations of the first to third rollers 116a, 118a, and 120a and the operations of the first to third rollers 116b, 118b, and 120b are the same as the movements of the movable plates 68, 70. Therefore, here, the operation of the first to third rollers 116a, 118a, and 120a will be mainly described, and the explanation of the operation of the first to third rollers 116b, 118b and 120b will be omitted.

Figure 6:
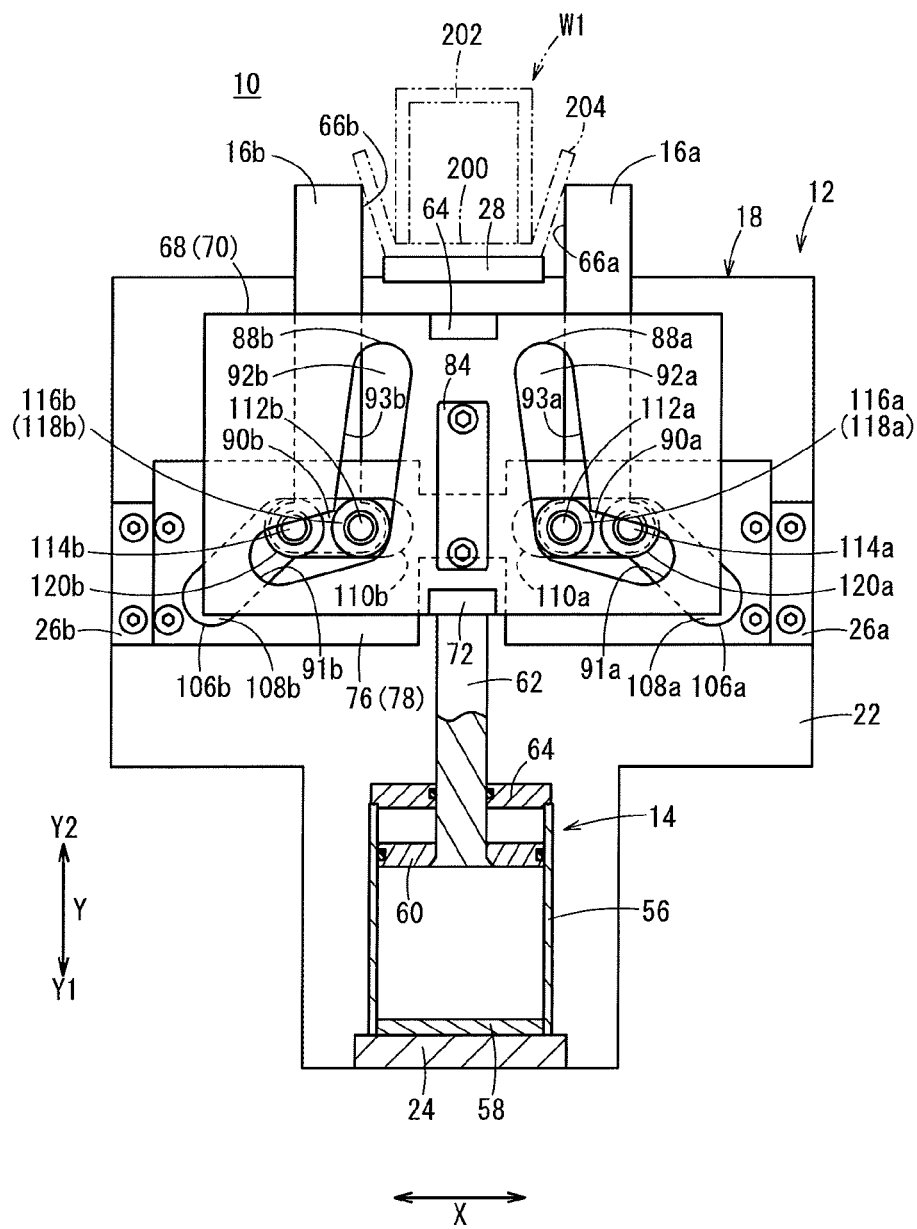
FIG. 6 is a partially omitted front view showing the maximum clamp distance of the clamp device.

As a result, the pair of clamp arms 16a, 16b move inward in the X direction (in directions approaching each other), and the gripping surfaces 66a, 66b are rotated so as to be parallel to the Y direction (see FIG. 6). In FIGS. 5 and 6, the clamp arm 16a rotates in the counterclockwise direction while moving to the side where the clamp arm 16b is located, and the clamp arm 16b rotates in the clockwise direction while moving to the side where the clamp arm 16a is located.

When the gripping surface 66a and the gripping surface 66b are parallel to each other, the first roller 116a is positioned at the boundary between the first hole portion 90a and the second hole portion 92a, the second roller 118a is positioned slightly inward from the center of the fourth hole portion 110a in the X direction, and the third roller 120a is positioned at the boundary between the third hole portion 108a and the fourth hole portion 110a. In the embodiment shown in FIG. 6, in this state, the gripping surfaces 66a, 66b contact the sidewalls 204 of the first frame 200.

When the piston 60 is further displaced toward the end block 58 under the action of the compressed fluid, the piston rod 62 and the movable plates 68, 70 are further displaced in the Y1 direction. Then, the first roller 116a rolls on the wall surface forming the second hole portion 92a in the Y2 direction, and the second roller 118a and the third roller 120a roll on the wall surface forming the fourth hole portion 110a inward in the X direction.

As a result, the pair of clamp arms 16a, 16b move in parallel in the X direction while pressing the sidewalls 204 of the first frame 200. That is, while maintaining the parallel state of the gripping surface 66a and the gripping surface 66b, the gap (clamp distance) between the gripping surface 66a and the gripping surface 66b is narrowed. At this time, the inner surfaces 93a, 93b outside the second hole portions 92a, 92b are inclined at the inclined surface angle θ (see FIG. 4A). Therefore, as the first rollers 116a, 116b move along the second hole portions 92a, 92b along the Y2 direction, the clamping force (gripping force) of the clamp arms 16a, 16b against the workpiece W1 increases due to the wedging action. Thereby, even when the restoring force accompanying the deformation of the both sidewalls 204 of the first frame 200 acts on the clamp arms 16a, 16b when gripping the workpiece W1, the workpiece W1 is surely and stably clamped.

Figure 7:
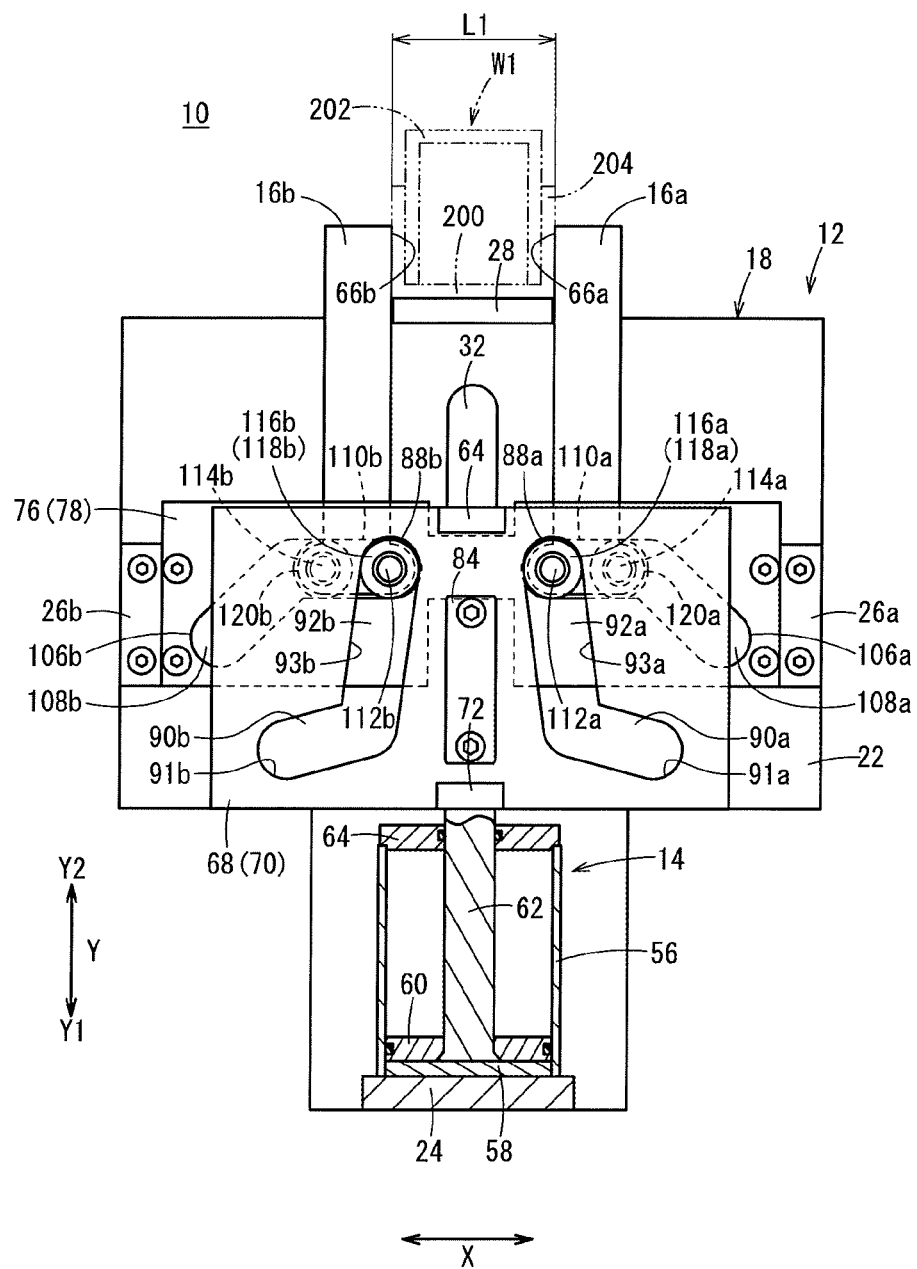
FIG. 7 is a partially omitted front view showing a clamping state of the clamp device.

Then, as the sidewalls 204 of the first frame 200 contact the second frame 202, clamping of the workpiece W1 is completed (see FIG. 7). In this state, the workpiece W1 is to be welded or treated.

Figure 8:
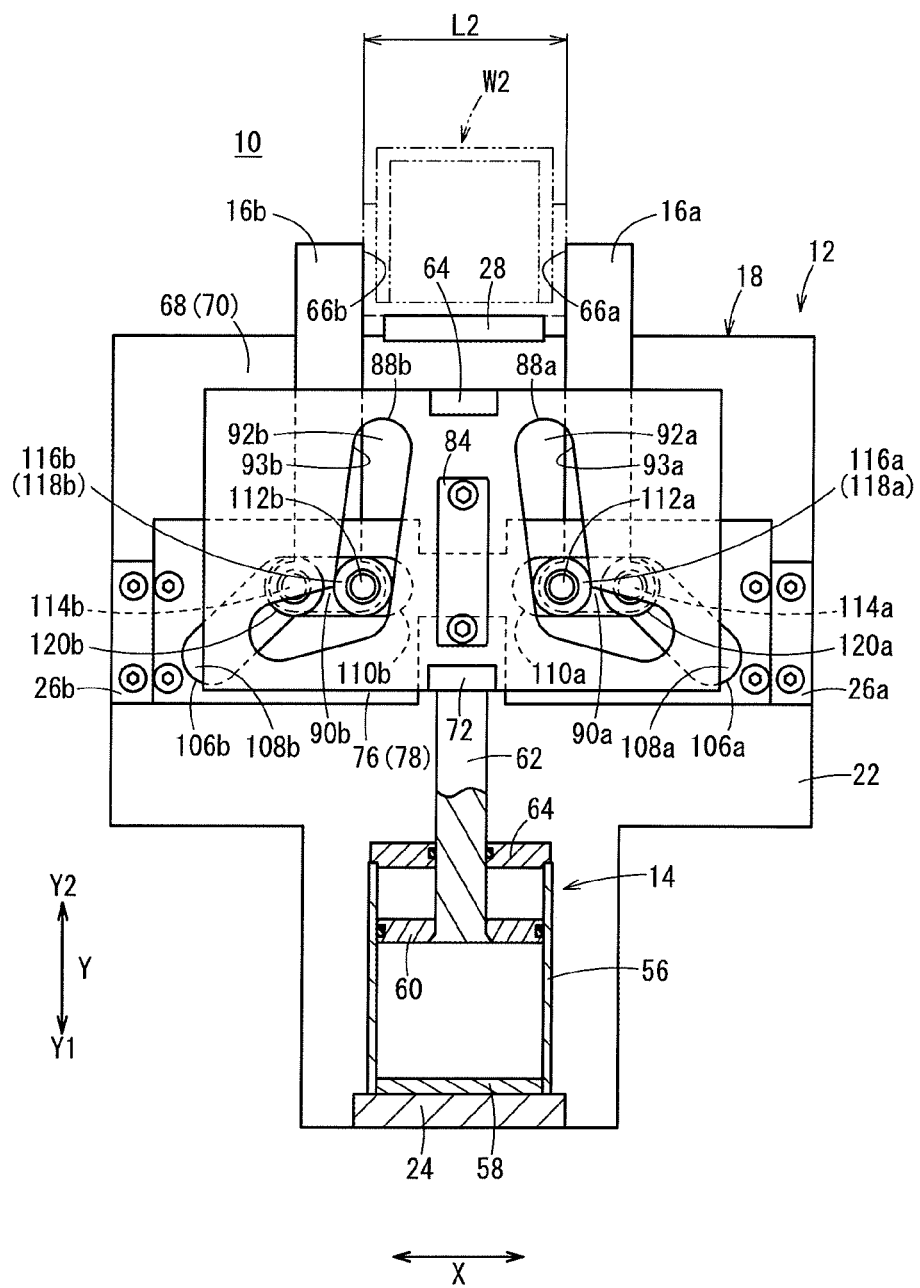
FIG. 8 is a partially omitted front view showing a state in which a workpiece having a width dimension different from the width dimension of the workpiece shown in FIG. 7.

In such a clamp device 10, the clamping interval can be changed within a predetermined range while holding the parallel state of the gripping surface 66a and the gripping surface 66b. Therefore, for example, even in the case of clamping the workpiece W2 having the width dimension L2 larger than the width dimension L1 of the workpiece W1 shown in FIG. 7, the gripping surfaces 66a, 66b reliably and stably clamp the workpiece W2 (see FIG. 8), avoiding one side abutment. In particular, as the first rollers 116a, 116b are pressed against the inner faces 93a, 93b of the second hole portions 92a, 92b positioned outward, the clamp arms 16a, 16b press and grasp the workpiece W2 by a wedge action in which the clamp arms 16a, 16b are translated in a direction to approach each other.

On the other hand, when releasing (unclamping) the clamp of the workpiece W1, the piston 60 is displaced toward the rod cover 64 under the action of the compressed fluid. Then, since the piston rod 62 and the movable plates 68, 70 are displaced in the Y2 direction, the pair of clamp arms 16a, 16b are translated in a direction to separate from each other (outward in the X direction) while maintaining the parallel state (see FIG. 6). As the piston 60 is further displaced toward the rod cover 64, the pair of clamp arms 16a, 16b move outward in the X direction and rotate so that the gripping surfaces 66a, 66b are apart from each other (see FIG. 5).

Then, as the clamp arm 16a contacts the inclined surface 52a and the clamp arm 16b contacts the inclined surface 52b, the rotation of these clamp arms 16a, 16b is stopped. The rotation of the clamp arms 16a, 16b may be stopped such that, for example, in a state where they are not in contact with the inclined surfaces 52a and 52b, the first rollers 116a and 116b contact the wall surfaces constituting the first cam holes 88a, 88b (the end portions 91a and 91b of the first hole portions 90a and 90b).

In the present embodiment, the driving force transmission mechanism 18 converts the linear motion of the piston 60 and the piston rod 62 into a first motion in which the pair of claim arms 16a, 16b rotate while moving toward and away from each other, and into a second motion in which the pair of clamp arms 16a, 16b are translated toward and away from each other in a state where the gripping surfaces 66a, 66b are parallel to each other.

Thus, since the clamp distance can be changed, it is possible to reliably and stably clamp plural types of workpieces W1, W2 having different widths while suppressing upsizing of the clamp device 10 with a simple configuration. Further, as the clamp arms 16a, 16b rotate, the distance between the gripping faces 66a, 66b in the unclamping state can be made relatively wide, so that the degree of freedom of the supply direction of the workpiece W1 can be increased.

According to the present embodiment, the first shaft 112a and the second shaft 114a are provided at one end portion of the clamp arm 16a, and the first shaft 112b and the second shaft 114b are provided at one end portion of the clamp arm 16b. Therefore, it is possible to prevent the end portions of the clamp arms 16a, 16b from interfering with each other in the unclamping state. Accordingly, since the maximum opening angle of the clamp arms 16a, 16b can be set relatively large, the degree of freedom in the supply direction and discharge direction of the workpieces W1, W2 can further be enhanced.

In this embodiment, the movable plate 68 (the movable plate 70), the fixed plate 76 (the fixed plate 78), the first rollers 116a, 116b, the second rollers 118a, 118b, and the third rollers 120a, 120b are provided on both sides in the Z direction of the clamp arms 16a, 16b in pairs. Thus, the first motion and the second motion of the clamp arms 16a, 16b can be performed more smoothly and stably.

Further, the slide portion 84 is guided by the elongated holes 30, 32 formed in the plate bodies 20, 22, so that the respective movable plates 68, 70 can be linearly moved smoothly. Therefore, the first motion and the second motion of the pair of clamp arms 16a, 16b can be performed more smoothly and stably.

The present embodiment is not limited to the above-described configuration. For example, the clamp device 10 may have a plurality of clamp arms 16a, 16b according to the shape of the workpiece to be clamped or the like. In this case, the number of the clamp arms 16a and the number of the clamp arms 16b may be the same or different.

Further, the driving force transmission mechanism 18 can be dispensed with the movable plate 70, the fixed plate 78, the first roller 116a, 116b, the second roller 118a, 118b, and the third rollers 120a, 120b that are disposed between the clamp arms 16a, 16b and the plate body 22. Even in this case, the same action and effect as those of the above-described embodiment can be obtained.

The invention claimed is:

1. A clamp device for clamping a workpiece between a plurality of clamp arms, comprising:
   a clamp body;
   a plurality of clamp arms supported movably with respect to the clamp body;
   a driving unit having a displacement body for linear reciprocating motion and mounted on the clamp body; and
   a driving force transmission mechanism configured to transmit a driving force from the driving unit to each of the clamp arms, wherein
   the driving force transmission mechanism is configured to convert the linear motion of the displacement body into a first motion for moving and rotating the plurality of clamp arms in a direction toward or away from each other, and in parallel into second motion for translating the plurality of clamp arms in a direction toward or away from each other in a state where gripping surfaces of the respective clamp arms to contact the workpiece are in parallel,
   wherein the driving force transmission mechanism comprises:
   a movable part provided on the displacement body, a first cam hole being formed in the movable part;
   a fixed part provided on the clamp body, a second cam hole being formed in the fixed part;
   a first shaft and a second shaft provided with respect to each of the clamp arms;
   a first roller rotatably provided on the first shaft and movable in the first cam hole;
   a second roller rotatably provided on the first shaft and movable in the second cam hole; and
   a third roller rotatably provided on the second shaft and movable in the second cam hole,
   wherein the movable part and the fixed part are arranged such that the first cam hole and the second cam hole at least partially overlap each other in plan view.

2. The clamp device according to claim 1, wherein the plurality of clamp arms are provided as one pair,
   the pair of clamp arms include a pair of the first cam holes provided substantially in a laterally symmetrical manner and a pair of second cam holes) provided substantially symmetrically in a laterally symmetrical manner,
   each of the first cam holes is formed of a first hole portion and a second hole portion, wherein the first hole portion extends toward a first axis of symmetry of the pair of first cam holes while inclining toward one side of a moving direction of the movable part, and the second hole portion extends from the first hole portion toward the one side of a moving direction of the movable part while inclining toward the first axis of symmetry,
   each of the second cam holes are formed of a third hole portion and a fourth hole portion, wherein the third hole portion extends toward a second axis of symmetry of the pair of the second cam holes while inclining toward the one side of a moving direction of the movable part, and the fourth hole portion extends from the third hole portion toward the second axis of symmetry.

3. The clamp device according to claim 1, wherein the first shaft and the second shaft are provided at an end of each of the clamp arms opposite to a side on which the gripping surface is located.

4. The clamp device according to claim 1, wherein the movable part, the fixed part, the first roller, the second roller and the third rollers are disposed on both sides of the clamp arm in pairs.

5. The clamp device according to claim 1, wherein the movable part comprises a slide portion,
   the clamp body comprises a guide portion configured to guide the slide portion along a moving direction of the displacement body.

6. The clamp device according to claim 1, further comprising a workpiece placement part on which the workpiece is placed, wherein
   each of the clamp arms is arranged such that the clamp arms in an unclamping state do not protrude from a workpiece placement surface of the workpiece placement part toward a side where the workpiece is located.

* * * * *